US005497973A

United States Patent [19]

Balzen et al.

[11] Patent Number: 5,497,973

[45] Date of Patent: Mar. 12, 1996

[54] THEFT RESISTANT SIGN CLAMP

[76] Inventors: William H. Balzen; Robert H. Balzen, both of 9518 Anderson Mill Rd., Austin, Tex. 78729

[21] Appl. No.: 190,780

[22] Filed: Jan. 31, 1994

[51] Int. Cl.$^{6}$ .............................. F16M 11/00; F16B 9/00

[52] U.S. Cl. .................. 248/551; 248/218.4; 248/230.5; 248/74.4; 411/122; 292/315

[58] Field of Search ................................ 248/551, 219.1, 248/218.4, 230, 231.6, 74.4, 62, 231.5, 316.5; 40/607, 608, 611, 612; 411/122, 123, 124, 910; 292/315, 307 R

[56] References Cited

U.S. PATENT DOCUMENTS

| | | | |
|---|---|---|---|
| 1,538,559 | 5/1925 | Johnson | 411/122 |
| 2,616,196 | 11/1952 | Sandahl, Jr. et al. | 40/607 |
| 3,575,367 | 4/1971 | Welsh | 248/62 X |
| 5,088,672 | 2/1992 | Neuendorf et al. | 248/218.4 X |

FOREIGN PATENT DOCUMENTS

| | | | |
|---|---|---|---|
| 0716698 | 12/1931 | France | 248/231.5 |
| 2819109 | 11/1979 | Germany | G09F 7/18 |
| 0488960 | 7/1938 | United Kingdom | 248/218.4 |
| 2057617 | 4/1981 | United Kingdom | 411/122 |

*Primary Examiner*—Karen J. Chotkowski
*Attorney, Agent, or Firm*—Harold H. Flanders

[57] ABSTRACT

A sign clamp and method of installing signs to make the sign theft resistant, safe, and attractive in appearance by designing the clamp to block access to the bolt attaching the sign to the clamp and restricting the removal of the clamp.

1 Claim, 2 Drawing Sheets

THEFT RESISTANT SIGN CLAMP

FIELD OF THE INVENTION

In general, the present invention relates to a theft resistant sign clamp. In particular, the present invention is used to install signs to standard steel posts in a manner which is theft resistant, safe, and attractive in appearance.

BACKGROUND OF THE INVENTION

While there are many, various devices which have been and are employed in fastening signs to posts, most suffer from the fact that in varying degrees they are easily tampered with so as to permit the theft of the sign. Some of the attempts to either provide for more securely fastened signs or clamps have merely given rise to modifications which clutter or detract from the appearance of the sign. In some cases the modifications actually create a hazard or potential hazard by employing protruding bolts or tabs which may in some situations constitute safety hazards.

The present invention overcomes the deficiencies of the prior art as described above by means of a structure which taken as a whole constitutes a new and novel theft resistant design. A special bend-over tab provides a new measure of theft resistance without the use of special vandal resistant fasteners. The sign clamp cannot be removed without first defeating the bend-over tab feature. Of course, additional theft resistance may still be achieved, if desired, by the use of special vandal resistant fasteners in conjunction with the design of the present invention.

By use of smooth carriage bolts to install and fasten the sign to the clamp, a clean, uncluttered appearance of the sign is achieved while preventing the removal of the sign from the sign clamp and post.

The design of the present invention has no protruding bolts or tabs which might constitute safety hazards, particularly where the signs are installed low to the ground, such as in the installation of handicapped parking signs.

SUMMARY OF THE INVENTION

Accordingly, it is an object of the present invention to provide a new, and highly effective theft resistant sign clamping design and method which overcomes the deficiencies of the prior art as described above.

It is a further object of the present invention to provide a theft resistant design of such devices.

Another object of the present invention is to provide a method of clamping a sign to a pole which makes theft difficult.

An additional object of the present invention is to achieve the above results while leaving the sign clean and uncluttered in appearance.

A further object of the present invention is to achieve the above noted benefits without creating a safety hazard by way of protruding bolts or tabs associated with the clamp.

Other objects and a fuller understanding of the invention may be had by referring to the following description and claims taken in conjunction with the accompanying drawings.

The present invention overcomes the deficiencies of the prior art and achieves its objectives by providing a new, novel design and method of achieving a theft and tamper resistant sign clamp. The clamp of the present invention consists of two members adapted to surround a sign pole.

The two members interlock in a smooth knuckle joint at their ends which are remote from the sign. One of the members ends in a flat plate to which a sign may be attached and which prevents access to the nut attaching the sign. The members have an anti-theft tab to inhibit removal of the nut on the bolt connecting the members at the end adjacent to the sign.

BRIEF DESCRIPTION OF THE DRAWINGS

In order to facilitate the understanding of the present invention, reference will now be made to the appended drawings of a preferred embodiment of the present invention. The drawings should not be construed as limiting the invention, but rather as being exemplary only.

DESCRIPTION OF THE INVENTION

Figure 1:
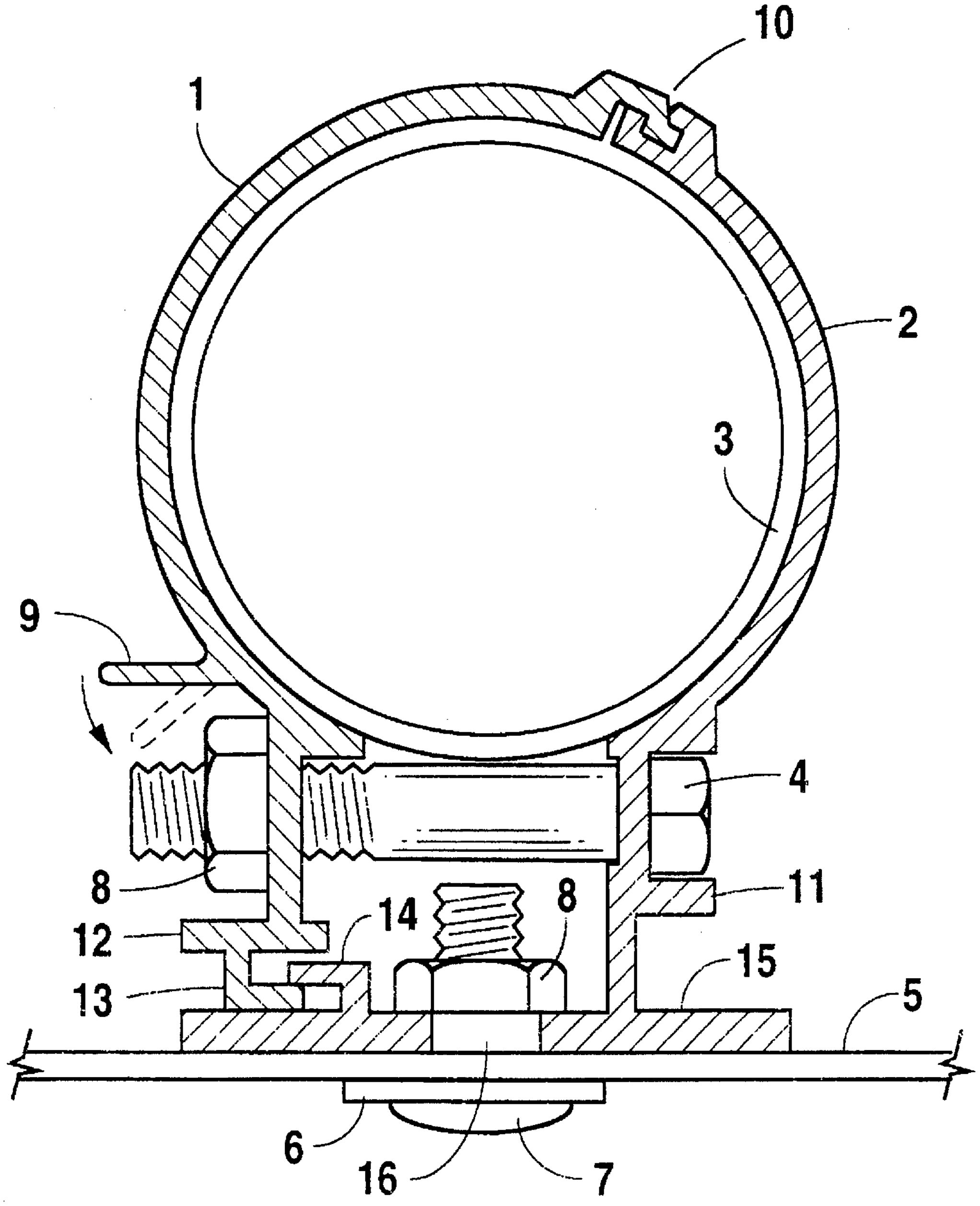
FIG. 1 is a partial cross-sectional representation of the clamp of the present invention in position on a mounting pole and having a sign affixed.
Figure 2:
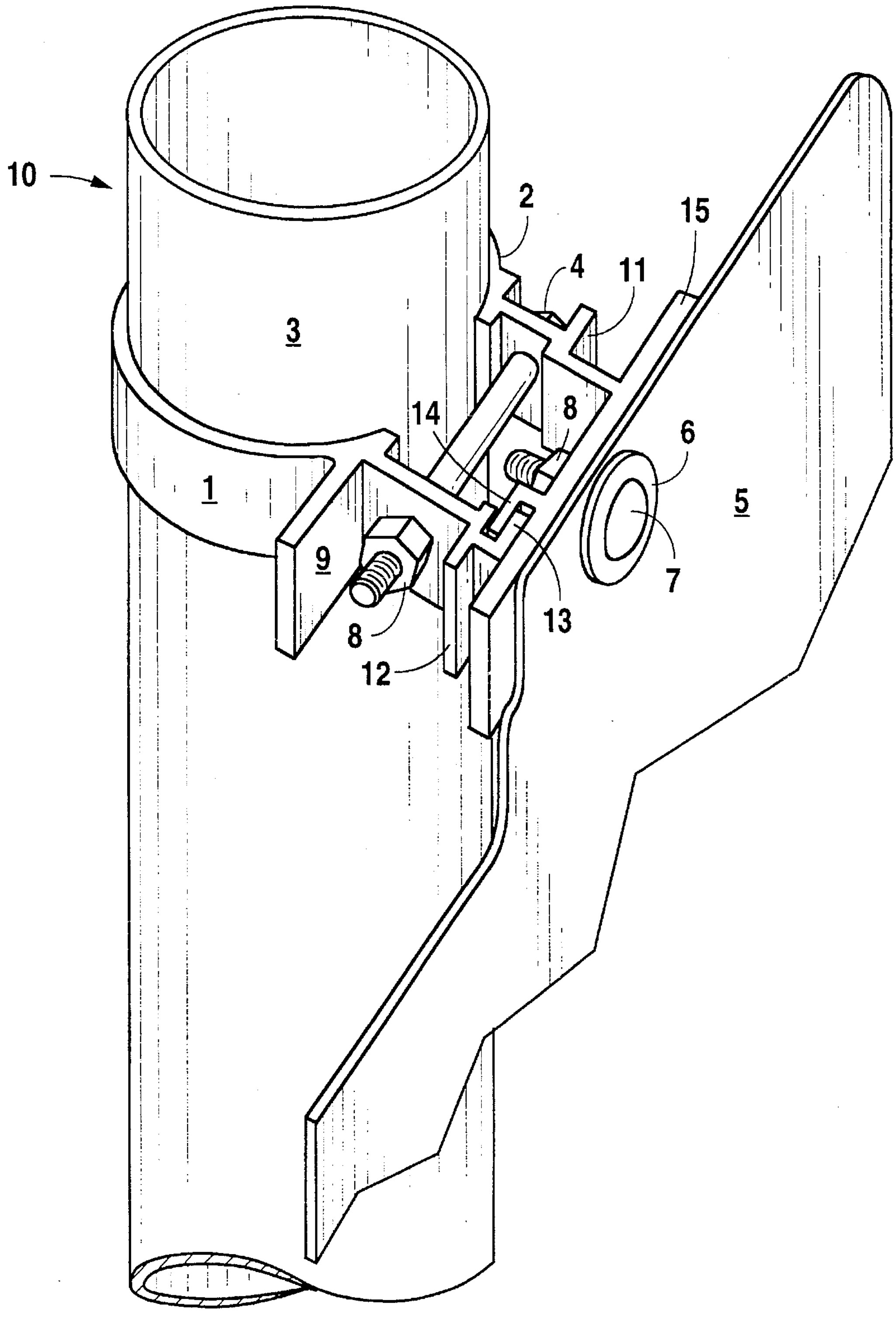
FIG. 2 is a perspective with a partial cut-away of the sign face.

The following is a description of a preferred embodiment of the present invention. The general design of the present invention may be appreciated by reference to the drawings. As will be noted in greater detail hereinafter, the details of the geometries employed may be varied widely to meet specific situations and requirements. However, for purposes of illustration the standard circular, cylindrical configurations are here employed.

As shown in the Figures, the clamp comprises two main bodies: extrusion A, here designated member 1, and extrusion B, here designated member 2. For ease and security in assembly extruded members 1 and 2 are connected by an eccentrically placed smooth knuckle joint, 10.

This design permits a sign panel 5 to be attached to extrusion member 2, by means of a smooth headed carriage bolt 7 which passes through a flat washer 6, extrusion member 2, and is secured by nut 8. Member 2, with the attached sign 5 may then be placed in position around sign pole 3, One end of member 1 may then be inserted into smooth knuckle joint 10 and pivoted into place about the sign pole 3. When in place and aligned, member 1 is then coupled with member 2 by means of a compression bolt 4 which passes through member 2, and member 1, and is secured by means of nut 8.

The theft resistant tab 9 may then be bent over as shown in dotted lines to prevent and hinder theft and tampering by limiting access to nut 8.

It should be noted that the head of compression bolt 4 is recessed within a locking well 11 which is recessed within the body of member 2. Also, to be noted, is the provision of tab 12 on member 1 to limit access to nut 8 and tab 13 on member 1, to interlock with tab 14 on member 2, thus securing the members 1 and 2 and increasing the rigidity of the clamp by limiting the degrees of freedom of motion of members 1 and 2.

Thus, the present invention consists of a theft and tamper resistant clamp for signs. The sign 5 is attached to the clamp member 2 with a carriage bolt 7 having a smooth head. The smooth head is on the outside of the sign and offers no opportunity for vandals or thieves attempting to remove the sign as the nut 8 securing the sign 5 to member 2 is within a cavity formed by the body of member 2 and that of member 1. Thus, a vandal or thief is denied access to the nut or nuts securing the sign 5 by means of the very body of the clamp securing the sign 5 to the sign pole 3. Once the clamp consisting of members 1 and 2 is installed on the sign pole 3, the sign 5 cannot be removed without first removing the sign clamp, members 1 and 2, from the pole 3 itself.

To further protect the sign 5 from removal, the compression bolt 4 is disposed transverse to the carriage bolt 7 and nut 8 which attach the sign 5 to the clamp member 2. A special tab 9 which is a part of the clamp member 1 is provided and adapted to be bent over the end of compression bolt 4 and nut 8, thereby restricting access to the nut 8 making it impossible to remove nut 8 and bolt 4 while tab 9 remains bent in place as shown by the dotted lines.

It is also to be noted that the clamp design provides for member 1 and member 2 to be eccentrically joined at the back portion of the post or pole 3 with a smooth knuckle joint 10 which has no projecting parts and is thus not likely to cause injury or damage in an accident or by other incidental contact.

As shown the female portion of smooth knuckle joint 10 constitutes the remote end of member 2 and the male portion of the smooth knuckle joint 10 constitutes the remote end of member 1.

In summary, the clamp of the present invention consists of two members, 1 and 2, which surround a sign pole 3. Member 1, includes, on it's remote end, the male portion of smooth knuckle joint 10, and adjacent the end of bolt 4 and nut 8, a tab 9 and a tab 12 which is adjacent to an L-shaped tab 13 which is adapted to interlock with a mating member, tab 14 of member 2. Member 2 has at it's remote end the female portion of smooth knuckle joint 10 and at the end adjacent the sign 5, mounted on plate end 15, a recess for locking in position the head of nut 4 and interlocking L-shaped tab 14 for mating with member 1. Member 2 ends in a flat plate 15 having a hole 16 therein for passage of carriage bolt 7. Tab 14 is supported by and on plate portion 15 of member 2.

By using the present invention in conjunction with a special vandal resistant nut, additional theft resistance can be achieved. The special vandal resistant nut (not shown and not a part of the present invention) is placed on bolt 4 instead of nut 8. In this configuration the clamp (and sign) can only be removed from the post by and after defeating both tab 9 and the special vandal resistant nut.

While specific components such as smooth carriage bolts and smooth knuckle joints have been referred to throughout as a part of the preferred embodiment of the present invention any other suitable components or elements which perform the same function, such as hinges or pins, may be used.

The parts herein described as extrusions are made of suitable extruded aluminum or aluminum alloys, however they may be made of other alloys or of plastics. The parts may also be formed as a single unit so long as the clamp may be fitted over the post.

The preferred embodiment has been described in terms of standard circular poles and the like, but other geometric shapes may be employed using the teachings of the present invention.

While the present invention has been described with reference to specific embodiments, this application is intended to cover those various changes and substitutions which may be made by those skilled in the art without departing from the spirit and scope of the appended claims.

What is claimed is:

1. A theft resistant sign clamp comprising:

(a) a first and a second member adapted to be secured about a sign post;

(b) said first and second members adapted to be connected together at one end by an interlocking joint and wherein interlocking means connect said members at the other end of said first and second members, (c) one of said members being adapted to secure a sign thereto by a smooth bolt and including means which restrict access to said smooth bolt, a fasting nut of which is positioned within said first and second members when they are secured about said post so that access to said fasting nut is restricted by the structure of said members;

(d) said first and second members adapted to be connected together at the end of said members adjacent said sign by nut and bolt means; one of said members having a recess means to restrict access to and motion of the head of said bolt means and wherein said nut and bolt means connecting said members is transverse to and further restricts access to said fasting nut and smooth bolt attaching a sign to said clamp; and (e) one of said members having tab means adapted to be bent into position to limit access to said nut of said nut and bolt means connecting said members to restrict removal of said nut means and of said members.

* * * * *